Nov. 18, 1958 O. K. KELLEY 2,860,747
HYDRODYNAMIC DRIVE DEVICES
Filed April 9, 1953
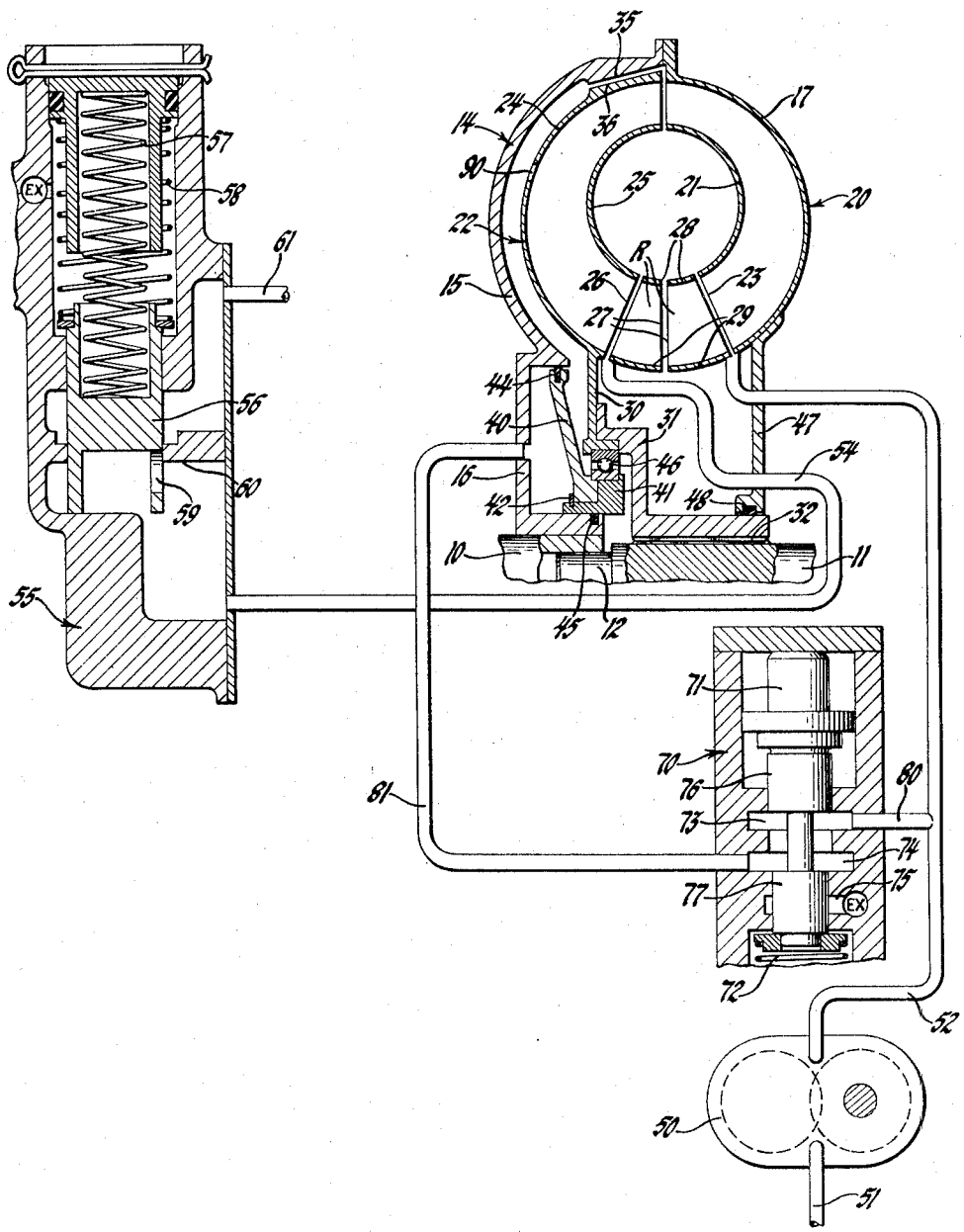
INVENTOR
Oliver K. Kelley
BY T. L. Chisholm
ATTORNEY United States Patent Office 2,860,747
Patented Nov. 18, 1958

2,860,747

HYDRODYNAMIC DRIVE DEVICES

Oliver K. Kelley, Birmingham, Mich., assignor to General Motors Corporation, Detroit, Mich., a corporation of Delaware Application April 9, 1953, Serial No. 347,695

7 Claims. (Cl. 192—3.2)

This invention relates to improvements in hydrodynamic drive devices and more particularly to such devices having incorporated therein lock-up clutches.

In automotive transmissions employing hydrodynamic drive devices, either of the fluid coupling type or the torque converter type, use has been made of lock-up clutches for so locking the drive shaft to the driven shaft as to afford a direct mechanical drive in which the action of the hydrodynamic drive device is effectively bypassed or short-circuited. Various types of lock-up clutches have been employed with varying degrees of success.

An object of the present invention is to provide a new and improved type of lock-up clutch which is of utmost simplicity, which requires a minimum of parts and which can be operated with a minimum of controls.

Another object of the invention is to provide a hydrodynamic drive device having a pump and a turbine, enclosed in a housing, through the agency of which the pump is driven, and with the turbine connected to the driven shaft with relative axial motion, in combination with a lock-up clutch formed by clutch formations on the inner surface of the housing and the outer surface of the turbine.

Another object of the invention is to provide a device, as just described, in which the so-called static pressure within the device is utilized for so moving the turbine as to engage the clutch formations, thereby causing the turbine and hence the driven shaft to rotate with the housing and hence the drive shaft.

A further object of the invention is to provide a device, as previously described, in which a piston is operatively connected to the turbine, which piston is continuously influenced in one direction by the static fluid pressure in the device and which is influenced in the opposite direction by the supply of fluid under pressure higher than that of the static pressure, such latter influence being selectively applied to operate the lock-up clutch.

In carrying out the foregoing and other objects of the invention, a hydrodynamic drive device incorporating the same is made up specifically of a torque converter which has as elements thereof a pump, a turbine and one or more reaction members. The device is enclosed within a housing which is connected to the drive shaft which may be the output shaft of an internal combustion engine, or the like, and the pump element has its vanes directly connected to a part of the housing. The turbine is mounted for rotation within the housing and, in this invention, is connected to the driven shaft by means of a suitable splined connection which permits limited axial motion of the turbine relative to the driven shaft, the pump and the housing. The interior surface of the housing is provided with clutch formations, such as surfaces, and the exterior surface of the turbine is provided with complementary formations. A piston is operatively connected to the turbine in such fashion that one side thereof is in direct contact with the fluid under pressure employed in the device and the other side thereof is sealed from such fluid, with arrangements made for supplying fluid under a different pressure thereto. The pressure of the fluid within the device is regulated by a regulator located preferably in the outlet line of the device and functioning to maintain the static pressure within the device at a predetermined level. Thus, if pump pressure is supplied to the device, the regulator will serve to maintain the static pressure at some level below the capabilities of the pump. Fluid under pressure from the pump can be supplied to the piston in opposition to the static pressure so that, when this pump pressure is applied to the piston, it is at a high enough pressure to overcome the static pressure within the device, thereby to move the piston and hence the turbine toward one of its limits, which places it in close proximity to the pump and separates the clutch formations. When this pump pressure is exhausted from the piston, the static pressure within the device is free to act on the opposite side of the piston, moving it axially of the device and consequently carrying the turbine therewith until the clutch formations are engaged, which engagement will be maintained under this static pressure.

With this arrangement it is possible to selectively engage or disengage the clutch formations by means of a simple valve which either supplies liquid under pump pressure to the piston or exhausts the same therefrom. This valve can be controlled either manually or automatically to lock the turbine, and hence the driven shaft, to the housing and the drive shaft as operating conditions of a transmission associated with the drive device may require.

Other features, objects and advantages of the invention will be apparent by reference to the following detailed description of the accompanying drawings, in which:

The figure is a schematic diagram of an apparatus embodying the invention.

Referring to the drawing, 10 indicates a drive shaft which may be the output shaft of an internal combustion engine or any other prime mover. The fly wheel and other customary accessories have been omitted. The driven shaft is represented at 11, such shaft being coaxial with the drive shaft 10, having a part 12 piloted therein. Associated with the drive and driven shafts is a hydrodynamic drive device indicated generally at 14, which device serves the purpose of transmitting torque from the drive shaft to the driven shaft. The device 14 is made up of a housing member 15 which is secured through an extension 16 to the drive shaft 10 to rotate therewith. The part 15 is connected in any suitable manner to a second housing part 17 which serves as the outer shroud of the pump 20. This pump has the customary vanes 23 mounted between the outer shroud body 17 and an inner shroud 21. A turbine 22 is composed of inner and outer shrouds 24 and 25 respectively, between which are mounted vanes 26 in the customary fashion. The device is completed by one or more reaction elements R formed by vanes 27 connected between inner and outer shrouds 28 and 29. These reaction members can be fixed against rotation or may be free wheel braked to ground to rotate in the same direction as the pump and turbine under certain operating conditions. Such an arrangement is well known in the art and hence is not illustrated in detail.

The outer shroud 24 of the turbine 22 has a ring-like extension 30 secured to a Z-bar 31 which in turn is splined to the drive shaft 11, as indicated at 32. This splined connection makes possible limited axial movement of the turbine relative to the housing 15 and the pump 20.

The inner surface of the housing part 15 is provided with a clutch formation such as clutch surface 35, while the outer surface of the turbine shroud 24 is provided with a complementary clutch surface 36. Located in the part 16 of the housing is a piston 40 which rests on a piston block 41, being retained in place by a snap ring 42.

Suitable packing 44 and 45 prevents leakage around the ends of the piston and piston block. An anti-friction bearing 46 is positioned between the piston block 41 and the end of the turbine extension 30 so that the turbine may rotate relative to the piston and also so that axial motion of the piston will be communicated to the turbine. The outer shroud 17 of the pump may have an extension 47 to the periphery of part of Z-bar 31 with packing material 48 to prevent leakage therearound. The purpose of illustrating this extension 47 in schematic fashion is to make possible a better understanding of the operation of the device.

Liquid to fill the drive device under suitable pressure for establishing a work circuit therein supplied by a pump 50 drawing liquid from a sump through pipe 51 and discharging it through pipe 52 which extends to the device 14. Outlet conduit 54 from the device 14 leads to a pressure regulator 55 which operates to determine the static pressure of the liquid within device 14. This regulator comprises a casing within which is slidably mounted a valve 56, normally pressed downwardly by springs 57 and 58, which are so calibrated as to permit upward movement of the valve 56 only upon the establishment at the bottom thereof of a predetermined pressure of liquid leaving the device 14 through the outlet conduit 54. The lower end of valve 56 is provided with a port 59 which can move relative to a land 60 formed in the body of the valve casing. If this valve 56 is moved upwardly under liquid pressure sufficiently for the port 59 to clear the top of the land 60, fluid entering the valve body through conduit 54 then passes from the valve body through a conduit 61 which may lead to suitable cooling apparatus or which may discharge directly into the customary sump from which pump 50 draws liquid.

Associated with the piston 40 is a valve body 70 having a valve member 71 reciprocable therein against pressure supplied by a spring 72. The valve body is provided with ports 73, 74 and 75, while the valve 71 is provided with spaced lands 76 and 77. The port 73 is connected to a branch line 80 from the pump supply line 52, while the port 74 is connected to a conduit 81 which extends to the part 16 of the housing of device 14 to supply liquid to the left-hand surface of the piston 40. The port 75 leads to exhaust. The valve 71 may be actuated to move against the resistance of the spring 72, either manually or automatically, as may be desired, and, since such arrangements are well known in the art, detailed illustration thereof has been omitted.

The operation of the hydrodynamic drive device just described is substantially as follows. Assuming that the device is to be operated as a torque converter or multiplier, it is necessary that the turbine 22 assume the position shown in the drawing. Consequently, liquid under full pump pressure from pump 50 is delivered through the branch line 80 to the port 73 and from port 74 through the conduit 81 to the cylinder formed within the part 16. The pump pressure is considerably higher than the predetermined static pressure within the device. For example, let it be assumed that this static pressure is to be 65 lbs. per square inch, the regulator 55 will have the springs thereof so calibrated as to yield under such pressure. Consequently, liquid from the pump delivered through the line 52 to the device will completely fill the same, even passing through the outer shroud of the turbine (openings 90 being provided for this purpose), and will fill the device until liquid is forced therefrom to the regulator 55. As soon as the predetermined static pressure, i. e. 60 lbs., is reached within the device, the regulator functions to relieve additional pressure even though the pump may have capabilities of delivering much higher pressure. With this arrangement it will be seen that each surface of the turbine extension 30 is subject to this static pressure since the liquid is confined by the seals 44, 45 and 48. This means that the right-hand surface of the piston 40 is subjected to the static pressure, in this example, 60 lbs. per square inch. At the same time the left-hand surface of piston 40 is subject to the full pump pressure which will always exceed the static pressure by a minimum of from 20 to 25 lbs. per square inch. Thus a situation exists in which a higher pressure occurs on one side of the piston than on the other, with the result that the piston is moved axially to the right as viewed in the drawing, and such axial motion compels a similar motion of the turbine 22. The clutch surfaces as shown are separated. The hydrodynamic device is now in condition for operation as a torque converter and will continue to function in the customary manner so long as speed of vehicle, torque demand and the like are in proper relation. If the reaction members 26 are free wheel braked to ground, it is possible that they will eventually rotate in the same direction as the pump 20 and turbine 22, in which event the device functions as a fluid coupling.

However, there may be occasions in which it is desirable for direct drive from the drive shaft 10 to the driven shaft 11 to be established. As before mentioned, the valve 71 may be operated manually or automatically to effect such direct drive connection. Consequently, when this valve is moved downwardly port 73 is closed by land 76 while port 81 is connected to exhausted port 75, with the result that the liquid acting on the left-hand surface of piston 40 drains from the cylinder in which this piston is mounted. With pressure relieved from the left-hand surface of piston 40, the static pressure within the device is free to apply its full force to the right-hand surface of this piston, moving it axially to the left. Such movement carries the turbine 22 axially to the left until the clutch surfaces 35 and 36 are engaged and held in engagement by the static pressure. When this condition exists it will be evident that the drive is from the shaft 10 through the housing 15, clutch surface 35, clutch surface 36, piston 22 to the splined connection thereof with the driven shaft 11. Direct drive is thus accomplished and the function of the device 14 as a drive device is bypassed or short-circuited.

The driven shaft 11 may constitute the propeller shaft of the transmission, or may be connected through reduction gearing, reverse gearing, etc., to the propeller shaft, all in well-known fashion.

From the foregoing it will be seen that the present invention provides a new, simple and efficient hydrodynamic drive device with a lock-up clutch incorporated therein, which device can be manufactured relatively inexpensively and which requires a minimum of parts and a minimum of controls. While the foregoing description has been devoted specifically to a torque converter, it will be understood that fluid couplings can be likewise provided with a lock-up clutch of this nature if desired. The invention is to be limited only by the following claims.

What is claimed is:

1. In a transmission having a drive shaft and a driven shaft, a hydrodynamic drive device comprising a pump and a turbine, a housing connecting said pump to said drive shaft and cooperating with said pump to form a rotatable container for liquid, said turbine being substantially enclosed by said housing, a driving connection between said turbine and said driven shaft, said driving connection permitting limited axial movement of said turbine, cooperating clutch formations on the interior of said housing and the exterior of said turbine, and means for selectively applying different fluid pressures to move said turbine axially toward and away from said housing to engage and disengage said clutch formations.

2. In a transmission having a drive shaft and a driven shaft, a hydrodynamic drive device comprising a pump and a turbine, a housing connecting said pump to said drive shaft and cooperating with said pump to form a rotatable container for liquid, said turbine being substantially enclosed by said housing, a driving connection between said turbine and said driven shaft, said driving connection permitting limited axial movement of said turbine, cooperating clutch formations on the interior of said housing and the exterior of said turbine, a piston operatively connected to said turbine, and means for selectively applying different fluid pressures to the opposite faces of said piston to move said turbine axially toward and away from said housing to engage and disengage said clutch formations.

3. In a transmission having a drive shaft and a driven shaft, a hydrodynamic drive device comprising a pump and a turbine, a housing connecting said pump to said drive shaft and cooperating with said pump to form a rotatable container for liquid, a driving connection between said turbine and said driven shaft, cooperating clutch formations on the interior of said housing and the exterior of said turbine, means for establishing predetermined fluid pressure in said device, means whereby said fluid pressure can cause relative movement between said housing and said turbine to engage said clutch formations, and means for causing fluid under pressure higher than said predetermined pressure to disengage said formations.

4. In a transmission having a drive shaft and a driven shaft, a hydrodynamic drive device comprising a pump and a turbine, a housing connecting said pump to said drive shaft and cooperating with said pump to form a rotatable container for liquid, a driving conection between said turbine and said driven shaft, said turbine being substantially enclosed by said housing, cooperating clutch formations on the interior of said housing and the exterior of said turbine, means for establishing predetermined fluid pressure in said device, means whereby said fluid pressure can cause relative movement between said housing and said turbine to engage said clutch formations, and means for causing fluid under pressure higher than said predetermined pressure to disengage said formations.

5. In a transmission having a drive shaft and a driven shaft, a hydrodynamic drive device comprising a pump and a turbine, a housing connecting said pump to said drive shaft and cooperating with said pump to form a rotatable container for liquid, a driving connection between said turbine and said driven shaft, said turbine being movable axially relative to said pump and said housing, cooperating clutch formations on the interior of said housing and the exterior of said turbine, means for establishing predetermined fluid pressure in said device, means whereby said fluid pressure can cause axial movement of said turbine to engage said clutch formations, and means for causing fluid under pressure higher than said predetermined pressure to disengage said formations.

6. In a transmission having a drive shaft and a driven shaft, a hydrodynamic drive device comprising a pump and a turbine, a housing connecting said pump to said drive shaft and cooperating with said pump to form a rotatable container for liquid, a driving connection between said turbine and said driven shaft, said turbine being movable axially relative to said housing, cooperating clutch formations on the interior of said housing and the exterior of said turbine, means for establishing predetermined fluid pressure in said device, a piston operatively connected to said turbine, one side of said piston being subject to said predetermined fluid pressure to cause movement of said turbine to engage said clutch formations, and the other side of said piston being subject to fluid under pressure higher than said predetermined pressure to move said turbine to disengage said formations.

7. In a transmission having a drive shaft and a driven shaft, a hydrodynamic drive device comprising a pump and a turbine, a housing connecting said pump to said drive shaft and substantially encompassing said turbine, said housing cooperating with said pump to form a rotatable container for liquid a driving connection between said turbine and said driven shaft, said turbine being movable toward and away from said housing, cooperating clutch formations on the interior of said housing and the exterior of said turbine, means for establishing predetermined fluid pressure in said device, a piston operatively connected to said turbine and having one face subject to said fluid pressure to cause movement of said turbine to engage said clutch formations, and means for supplying fluid under pressure higher than said predetermined pressure to the opposite face of said piston, said last mentioned means being selectively operable to disengage said formations.

References Cited in the file of this patent

UNITED STATES PATENTS

| | | |
|---|---|---|
| 1,858,514 | Lell | May 17, 1932 |
| 2,055,300 | Maurer | Sept. 22, 1936 |
| 2,130,895 | Ness | Sept. 20, 1938 |
| 2,731,119 | Burdett et al. | Jan. 17, 1956 |

FOREIGN PATENTS

| | | |
|---|---|---|
| 668,839 | France | Nov. 7, 1929 |
| 733,811 | France | July 18, 1932 |